Sept. 20, 1949.                     E. BUGATTI                           2,482,536
                         LUBRICATING MEANS FOR BEARINGS
                              AND SPINDLES OR SHAFTS
Filed Sept. 11, 1945                                                 3 Sheets-Sheet 1
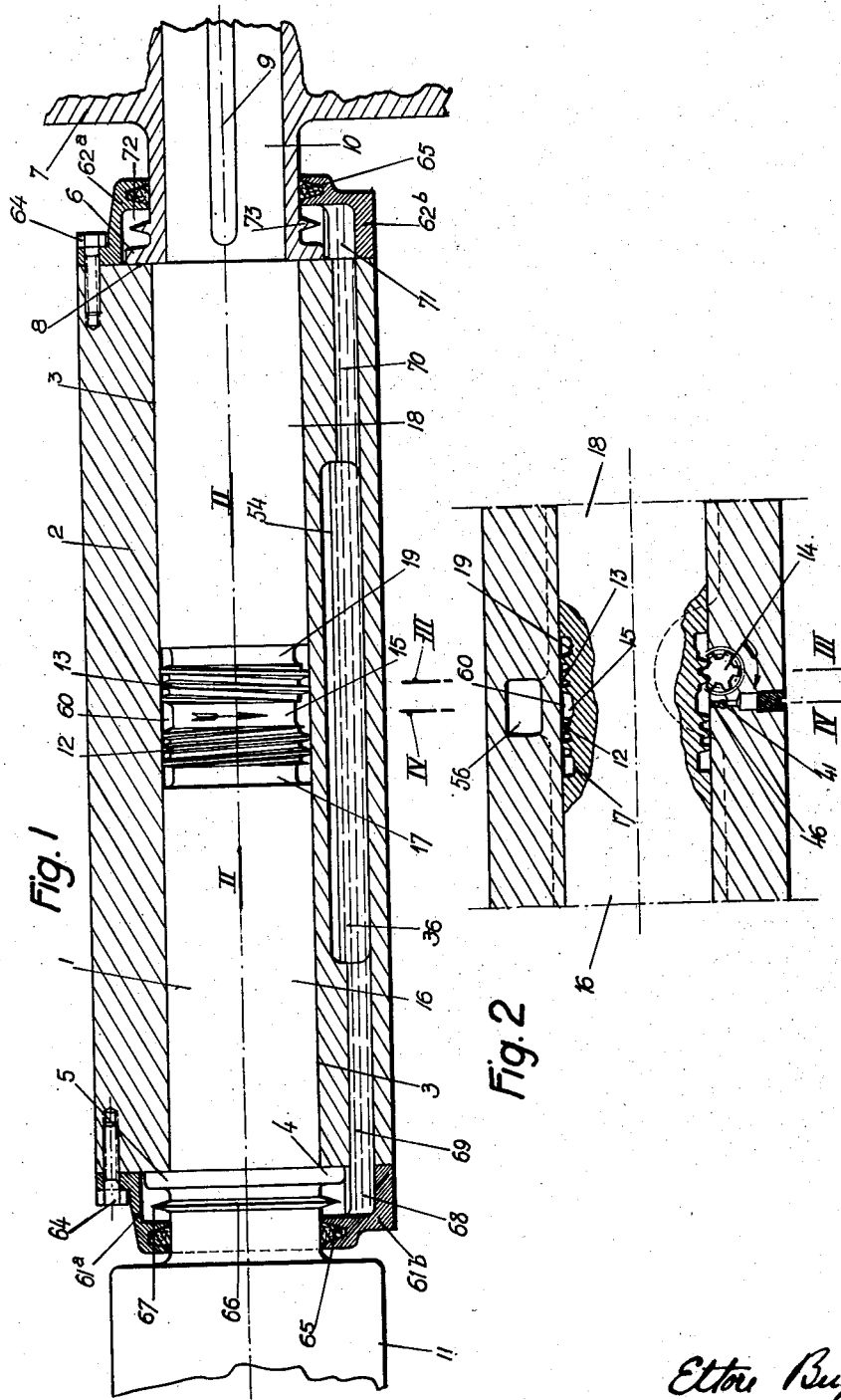
Ettore Bugatti
By Mauro + Lewis
   Attorneys

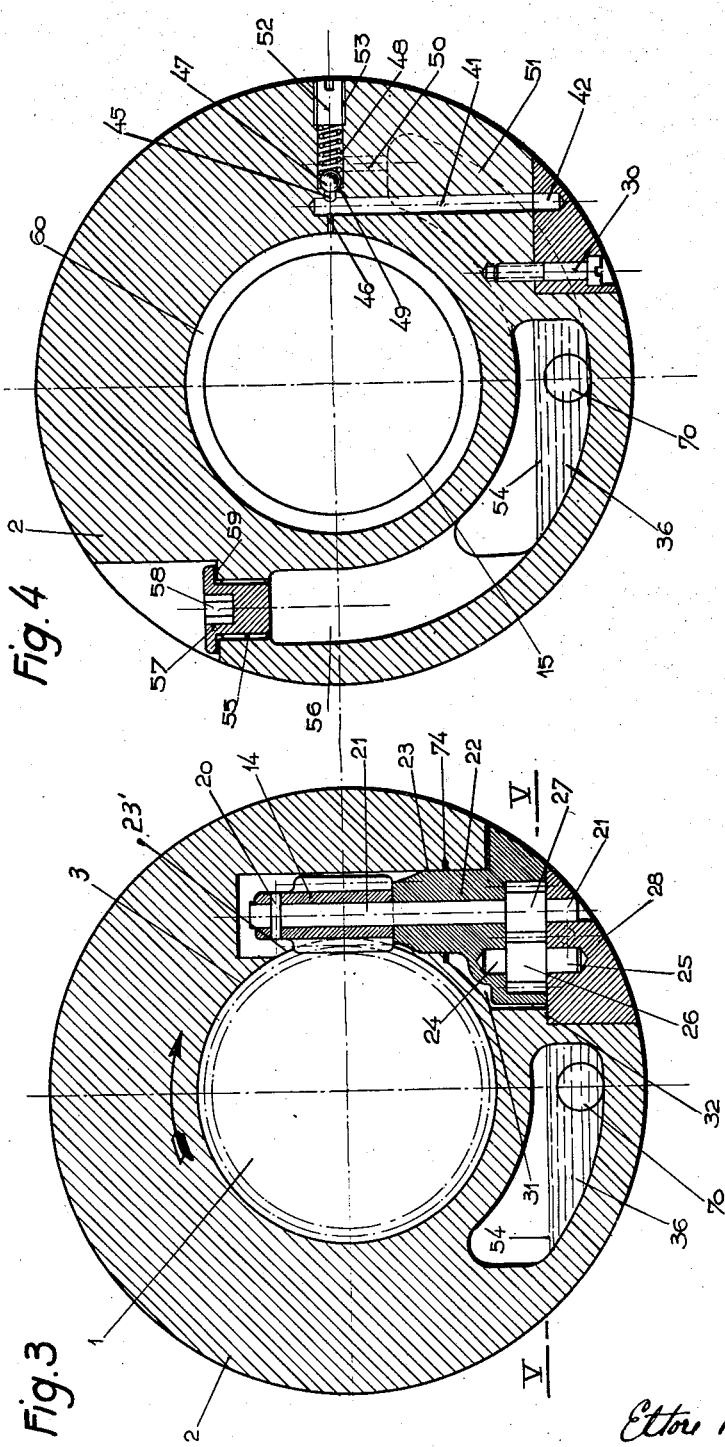

Sept. 20, 1949.  E. BUGATTI  2,482,536
LUBRICATING MEANS FOR BEARINGS
AND SPINDLES OR SHAFTS
Filed Sept. 11, 1945  3 Sheets-Sheet 3
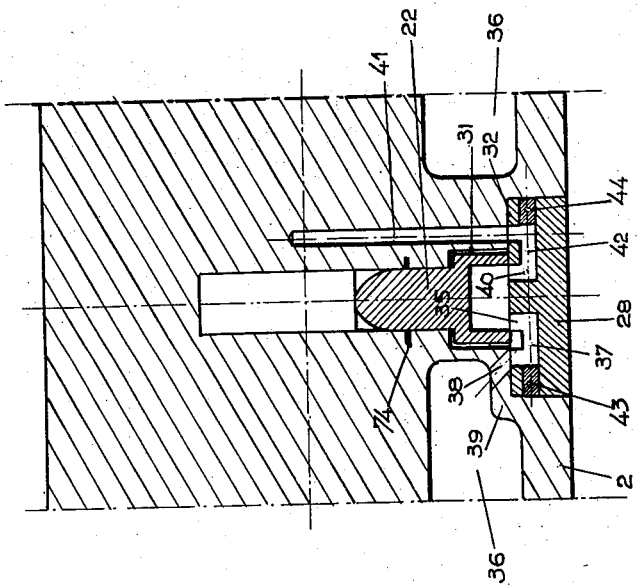
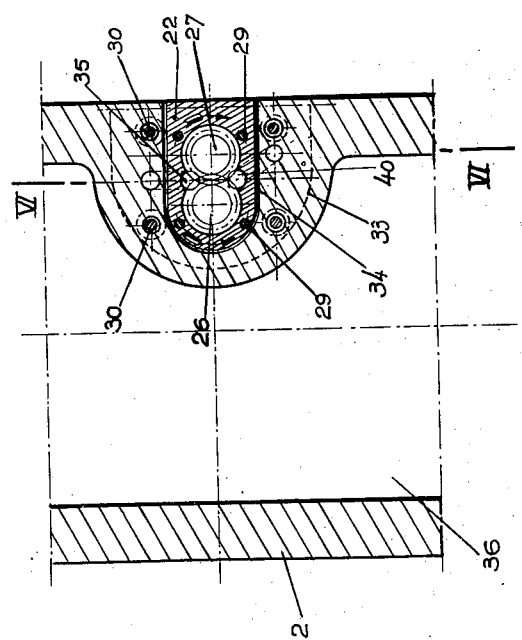
Ettore Bugatti
By Mauro & Lewis
Attorney Patented Sept. 20, 1949

2,482,536

UNITED STATES PATENT OFFICE 2,482,536

LUBRICATING MEANS FOR BEARINGS AND SPINDLES OR SHAFTS

Ettore Bugatti, Paris, France

Application September 11, 1945, Serial No. 615,637
In France September 12, 1944

8 Claims. (Cl. 308—122)

1

This invention relates to a bearing or support combined with a shaft or spindle rotating at a high speed and particularly with a shaft or pin intended to be held at a comparatively great distance from the driving shaft. It relates mainly to machines such as grinding machines, milling machines, etc., but in its application it is not confined to machine tools.

An essential feature of the invention lies in the fact that the bearing, presenting a smooth boring is provided with a lubricating pump entirely housed in its mass and actuated by an endless screw provided on the shaft towards the middle of the bearing, while a second screw near the first but distinct therefrom and of opposite pitch, serves jointly with the first to drive towards the ends of the bearing the lubricant supplied by the pump in the interval which separates them.

The invention therefore refers essentially and more generally to the combination of a lubrication pump housed within a shaft bearing with controlling means provided on said shaft, preferably within the limits actually drawn by the bearing, so as to form an autonomous lubricating unit.

The lubricant is preferably placed in a tank provided in the body of the bearing whilst ducts bring back to said tank the lubricant which has been forced by the screws up to the vicinity of the ends of the bearing.

The bearing or support may in particular have a cylindrical external surface and an axis strictly concentric with the axis of the shaft, its component elements particularly those of the lubricating device having been designed so as not to have any projection.

The above features, autonomous lubrication and a strictly cylindrical shape, afford great facilities either for the study and construction of new machines or for adaptation to existing machines it is intended to transform with a view to modernizing them.

The advantages offered by the invention are as follows:

(1) The method of lubrication above described affords the maximum of efficiency for shafts rotating at a high speed coupled with heavy members as it happens in the case of certain machine tools such as grinding machines. This method of lubricating is very favourable for the formation of a film of oil between the spindle and the bearing, the maintenance of said film being assured by the pressure transmitted through the pump. Furthermore the two screws with inverted pitch cut in the spindle ensure a correct distribution of

2 lubricant in the two collars of the bearing located on each side of the screw zone.

(2) The strictly cylindrical shape of the outer casing of the bearing lends itself with great facility to all kinds of mounting and greatly simplifies the operations for checking the position of said bearing on the machine. It is only necessary to provide in said machine, either a semi-cylindrical cradle with securing straps, or a couple of supports bored to the diameter of the bearing. The machining of said cradle or said supports is done once for all and the mounting of the bearing necessitates no adjustment.

The following description with reference to the accompanying drawing given by way of non-limitative example shows clearly how the invention can be performed whilst the features shown in the text as well as in the drawing naturally form part of said invention.

Figure 1 is a longitudinal section through the axis of a bearing constructed according to the invention.

Figure 2 is a partial section along II—II in Figure 1.

Figure 3 is a transverse section on a larger scale through the axis of the oil pump, namely along III—III in Figure 2.

Figure 4 is a transverse section on a larger scale along IV—IV in Figure 2.

Figure 5 shows a section of the oil pump along a horizontal plane V—V in Figure 3.

Figure 6 is a section along VI—VI in Figure 5.

The spindle 1 rotates in a bearing 2 the boring 3 of which is perfectly smooth. It is axially held by its flange 4 which is in friction against one of the faces 5 of the bearing 2 and by the flange 6 of a driving plate 7 in contact with the other face 8 of the bearing 2.

The spindle 1 is driven from the plate 7 through a cotter 9 and is set in the part 10 of the spindle 1 on which the plate 7 is mounted. Said plate 7 may be replaced by any other transmission device such as a pulley, a universal joint, gears, etc.

The end of the spindle 1 is shaped so as to take up either a grinding wheel, the hub of which is shown at 11 or a tool-holder, a cutter or any other machining apparatus.

In its central part, the spindle 1 comprises a right hand threaded screw or worm 12 and another screw or worm 13 also threaded but lefthand. The screw 13 engages a worm-wheel 14 shown in Figure 2. The two screws 12 and 13 are separated by a cylindrical part 15, the diameter of which is less than the bottom or root diameter of the worms 12 and 13. Between the worm 12 and the collar 16 of the spindle 1 as well as between the worm 13 and the collar 18 there are also two cylindrical parts 17 and 19 similar to 15. These recesses 17 and 19 are not absolutely necessary; their presence is justified by machining facilities for worms 12 and 13.

The worm-wheel 14 (Figure 3) is cottered at 20 on the shaft 21 of the oil pump. The body 22 of said pump is fitted in a boring 23 provided in the bearing 2 and in open communication with the boring 3 of said bearing through a window 23' (Fig. 3). A packing 74 ensures tightness around the body 22. Said body 22 and the cover 28 guide the shaft 21 in its rotation, as well as the journals 24 and 25 of a driver pinion 26 which engages a driving pinion 27 fast with the shaft 21. The cover 28 assembled with the body 22 by a set of screws 29 (Figure 5) is itself fixed to the bearing 1 by other screws 30 (Figure 4).

The housing 31 for the body of the pump 22 in the thickness of the bearing 2 comprises a dressed face 32 which supports the cover 28, the outer contour 33 of which protrudes for that purpose, relatively to the contour 34 of the body 22 (Figure 5).

The direction of rotation of the pinions 26 and 27 driven by the worm-wheel 14 depends upon the direction of the thread of the worm 13. In the example chosen, the rotation takes place in the direction of the arrows in Figures 1, 2, 3 and 5 whereby the position of the suction and delivery openings are determined.

The suction opening 35 of the pump communicates with an oil tank 36 provided in the lower part of the bearing 2, through a channel 37 bored in the cover 28 and through a hole 38 perforated opposite in the wall 39 of the housing 31 of the bearing 2 (Figure 6). The delivery opening 40 is connected to a well 41 through a channel 42 similar to the channel 37. Stoppers 43 and 44 are positioned in the cover 28 after holes forming the channels 37 and 42 have been bored.

A well 41 (Figure 4) rises preferably up to the horizontal axis of the bearing 2 where it meets a channel 45. The latter comprises a part 46 calibrated with a smaller diameter than the diameter of 45 so as to regulate the delivery of oil. On the other side of the well 41, the channel 45 is bored in order to serve as a lodgement to a ball 47 and to a spring 48 weighted so as to balance the pressure of the oil through the opening 49 of the channel 45. When said pressure reaches a sufficient value to compress the spring 48, the ball 47 leaves its seat and the oil flows through the opening 49 and a channel 50 which leads into a recess 51 in constant communication with the tank 36.

A stopper 52 screwed in a threaded part 53 of the bearing 2 makes it possible to adjust the tension of the spring 48, to replace said spring in case of rupture, or also to ascertain whether the nozzle 46 has not been accidentally obstructed.

The filling of the tank 36 up to a certain level 54 is effected through a threaded aperture 55 arranged as high as possible and in communication through a passage 56 with the tank 36. The stopper 57 provided, for instance, with a hexagonal cavity 58 and a packing 59 completes the filling device.

The oil after flowing into the space 60 comprised between the cylindrical part 15 of the spindle 1 and the boring 3 of the bearing 2, is driven towards the collars 16 and 18 of the spindle 1 by means of the worms or screws 12 and 13, the thread direction of which has been suitably chosen for the direction of rotation of the spindle 1 and, with the help of the pressure it reaches the faces 5 and 8 of the bearing 2. On said faces 5 and 8 are fixed covers in two pieces 61a and 61b for one, and 62a and 62b for the other. Said covers are fixed to the bearing 2 by screws 64 and they include the devices adapted to secure tightness and avoid the intrusion of dust into the bearing 2 as, for instance, felts 65.

A deflector 66 which is integral with the spindle 1 revolves in a pan 67 provided in the cover 61a, 61b and collects the projections of oil escaping from the bearing 2 and falling back into a depression 68 at the base of the pan 67. A channel 69 bored in the thickness of the bearing 2 establishes communication between the depression 68 and the tank 36. A channel 70 arranged in a similar manner ensures the return of the oil collected by the depression 71 in the pan 72 of the cover 62a, 62b in which cover a deflector 73 which is integral with the driving plate 7, revolves.

It is obvious that modifications may be introduced in the device above described without thereby departing from the scope of the present invention.

What I claim is:

1. The combination of a shaft including an integral gear, the outer periphery of which is flush with the periphery of the remainder of said shaft, a bearing for said shaft having a smooth bore in operative engagement with said shaft, extending along said shaft on either side of said gear, the bearing further including a recess which opens in said bore in close proximity to said gear and a separate lubricant passage from said recess to said bore; and means located in said recess and supported from the bearing for forcing lubricant into said passage, the means including a gear adapted and arranged to mesh with the first-named gear.

2. The combination of a shaft having a peripheral groove; a pair of spaced-apart, oppositely pitched, spiral ribs located in said groove with their outer periphery flush with the cylinder comprised by the general periphery of said shaft, said ribs being fast with said shaft; and a bearing for said shaft, enclosing the same and extending on either side of the groove to points remote therefrom, said bearing having a pressure lubricant supply duct opening into the bore of said bearing opposite said groove.

3. The combination of a shaft having a pair of spaced-apart, oppositely threaded worms formed thereon with their outer periphery flush with the general outer periphery of the shaft, and a peripheral groove between said worms; a lubricant pump having a worm-wheel as a control member therefor, said worm-wheel being adapted and arranged to mesh with one of said worms on the shaft; and rigid means providing a continuous bearing for said shaft, in operative contact therewith along the outer periphery of said worms and a substantial portion of the nongrooved sections of said shaft, for confining and supporting said lubricant pump, said means including a lubricant passage from said pump to the space between said groove and said means.

4. A self-contained, shaft bearing and lubricating unit which comprises the combination of a tubular rigid member with substantially continuous, smooth inner and outer cylindrical peripheries, said member having in its annular wall a longitudinal inner channel co-extensive therewith, an inner chamber located substantially midway between the ends of said member, adapted and arranged to communicate with said channel, and an inner lubricant delivering duct from said chamber to the inner periphery of said member substantially midway between the ends thereof; and a lubricant pump supported and confined in said chamber, adapted to force lubricant from said channel into said duct.

5. The combination of a shaft having a pair of proximate but spaced-apart, oppositely pitched Archimedean screws cut in its periphery with an intervening peripheral groove; and an enclosing bearing for said shaft extending over a considerable length on either side of the pair of screws in operative engagement with said shaft, said bearing having a pressure lubricant delivery port which opens in the bore thereof opposite said groove.

6. The combination of a rotary shaft including a smooth section followed with a spirally grooved section of minor length; a lubricant pump in close proximity to said shaft, including a control member for operating said pump in operating engagement with the grooved section of the shaft so as to be driven thereby as the shaft revolves; and means co-extensive with both sections of the shaft, in ring formation and contacting relationship therewith, providing a bearing for said shaft and a housing for said pump, including a lubricant delivery duct from the output side of the pump to a point opposite the shaft on the side of the grooved section which is away from the smooth section.

7. The combination of a bearing having a tubular rigid body with smooth inner and outer periphery, a recess extending inwardly from the outer periphery to the inner periphery of said body so that the recess communicates with the bore of the bearing through a window, and a separate duct from said recess to the inner periphery of said body; a shaft revolubly borne in said tubular body; a lubricant pump having a lubricant inlet, fitted in said body recess, having an end rotary control member and so arranged that said control member is located in said recess opposite said window; means on said shaft operatively engaging said control member through said window for driving the same; and means removably attached to said body for supporting said pump in said body and sealing said recess, said means having a duct therein adapted and arranged to place the delivery side of the pump in open communication with the first-named duct.

8. The combination of claim 7, the tubular bearing body further including an inner lubricant reservoir in communication with said lubricant inlet of said pump and a lubricant return duct from said first-named duct to said reservoir, and a spring-urged check valve in said return duct.

ETTORE BUGATTI.

REFERENCES CITED

The following references are of record in the file of this patent:

UNITED STATES PATENTS

| Number    | Name      | Date           |
|-----------|-----------|----------------|
| 824,187   | Lowe      | June 26, 1906  |
| 1,508,085 | Cooper    | Sept. 9, 1924  |
| 1,745,871 | Spillmann | Feb. 4, 1930   |
| 1,934,278 | Raule     | Nov. 7, 1933   |
| 2,249,843 | Marsland  | July 22, 1941  |